US006595730B2

(12) United States Patent
Bergamo

(10) Patent No.: US 6,595,730 B2
(45) Date of Patent: Jul. 22, 2003

(54) BIT FOR REMOVING DAMAGED SCREWS

(75) Inventor: Peter J. Bergamo, Wolcott, CT (US)

(73) Assignee: Alden Corporation, Wolcott, CT (US)

( * ) Notice: Subject to any disclaimer, the term of this patent is extended or adjusted under 35 U.S.C. 154(b) by 59 days.

(21) Appl. No.: 09/780,706

(22) Filed: Feb. 12, 2001

(65) Prior Publication Data

US 2001/0026737 A1 Oct. 4, 2001

Related U.S. Application Data

(63) Continuation-in-part of application No. 09/519,362, filed on Mar. 6, 2000, now abandoned.

(51) Int. Cl.[7] .......................... B23B 39/00; B23B 41/00

(52) U.S. Cl. ........................................ 408/227; 408/229

(58) Field of Search ................................. 408/227, 228, 408/229; 407/53, 54, 55

(56) References Cited

U.S. PATENT DOCUMENTS 500,213 A * 6/1893 Richards ..................... 408/229
3,010,345 A * 11/1961 Wagner ....................... 408/229
4,434,687 A * 3/1984 Vickio .......................... 81/441
4,503,737 A * 3/1985 DiGiovanni ................. 81/436
4,594,034 A * 6/1986 Maier .......................... 408/211
4,599,024 A * 7/1986 Sano et al. ................. 408/228
5,570,978 A * 11/1996 Rees et al. ................... 408/144
5,697,935 A * 12/1997 Moran et al. ............... 408/204
6,176,161 B1 * 1/2001 Huang et al. .............. 81/177.2

* cited by examiner

*Primary Examiner*—Henry W. H. Tsai
(74) *Attorney, Agent, or Firm*—Dallett Hoopes

(57) ABSTRACT

This bit has an axis and a tip end with an obtuse angle. There are multiple scraping surfaces, each facing counter-clockwise into a longitudinal recess in the tip end. Each scraping surface has a scraping edge at an angle of about 55° to 70° to the axis. Behind each scraping surface the outer surface of the tip end curves down to a rearward edge adjacent another of the longitudinal recesses, the rearward edges each being disposed at a sharper angle to the axis than the scraping edge so that there is some relief, allowing the scraping edge to be more pronounced and enhance its ability to dig into the metal of a deformed screw at points removed from the axis to get a good purchase on the screw.

7 Claims, 3 Drawing Sheets

BIT FOR REMOVING DAMAGED SCREWS

CROSS REFERENCE TO RELATED APPLICATIONS

This application is a Continuation in Part of pending application Ser. No. 09/519,362 filed Mar. 6, 2000, now abandoned.

FIELD OF THE INVENTION

This invention relates to a bit for removing damaged screws by backing them out. More specifically, this invention relates to such a bit especially adapted for use in a power drill running in a counter-clockwise direction.

BACKGROUND OF THE INVENTION

In U.S. Pat. Nos. 4,406,917, 4,777,850, 5,031,487, and 5,251,516 assigned to my assignee, there are disclosed various bits and other devices for removing broken bolts. U.S. Pat. No. 5,251,516, for instance, involves chucking a bit in a power drill and running the drill clockwise and making a small hole in the broken end of the bolt. A reverse threaded device is then snugly inserted in the drill chuck, the rotation of the drill reversed, and the bit is moved into the hole. The threads on the reverse threaded device catch the edges of the hole and spin the broken bolt out of the hole.

There has been a need for a device to remove screws, the heads of which have been damaged by rounding out the Philips screw cross recess or ripping out the side of the slot of a regular screw. Also, the screw head may have been covered by paint so that the recess or slot is no longer pronounced enough to get a good purchase on it by a screwdriver.

SUMMARY OF THE INVENTION

For removing damaged screws, the invention is a bit having an axis and a tip end. The tip end has diametrically opposed scraping surfaces with edges, the surfaces facing in a counter-clockwise direction. The surface and edges are in the plane of the axis. Behind each scraping edge is a support area. The support area may have its face relieved so as to make the scraping edge more pronounced. The edges meet in a point at an obtuse angle.

BRIEF DESCRIPTION OF THE DRAWINGS

Further objects and features of the invention will be clear to those skilled in the art from a review of the following specification and drawings, all of which present a non-limiting form of the invention. In the drawings.

DETAILED DESCRIPTION OF EMBODIMENTS

Figure 1:
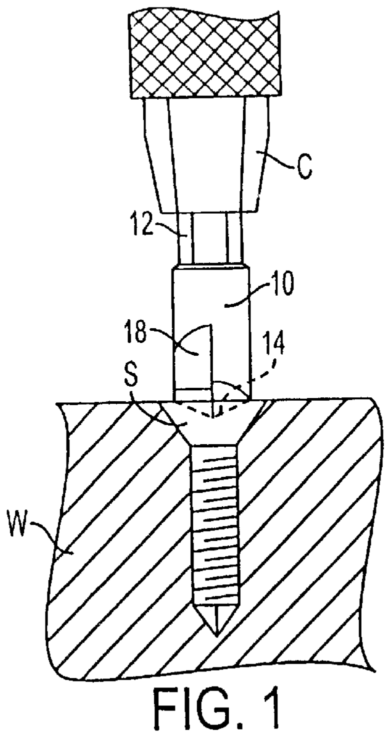
FIG. 1 is an elevational view partly in section of a bit embodying the invention installed in a power drill chuck and engaging a screw in the process being removed.

A bit is shown in elevation in FIG. 1 and generally designated 10. The bit may be smoothly cylindrical or even hex shape for its entire length. It is shown held in a chuck C by its hexagonal stem 12. The tip 14 is shown engaging the damaged head of a Philips screw S which is screwed into a block of wood W in the example shown, although it could be a self-tapping metal screw.

The tip 14 of the bit comprises two longitudinal recesses 18 (FIG. 4) bounded by on one side a longitudinal scraping surface 20 facing in the counter-clockwise direction and having a scraping edge 22 which is preferably a straight line extending from the periphery 24 of the bit to the axis 26.

Figure 4:
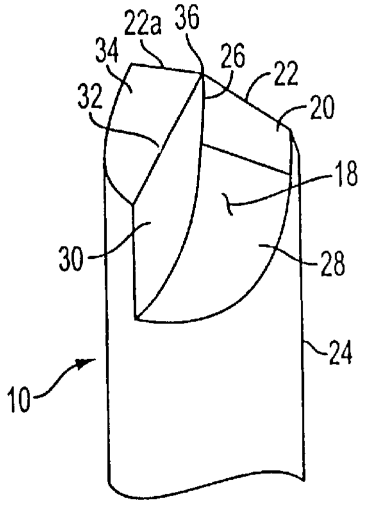
FIG. 4 is a fragmentary perspective view of the tip of the bit.
Figure 5A:
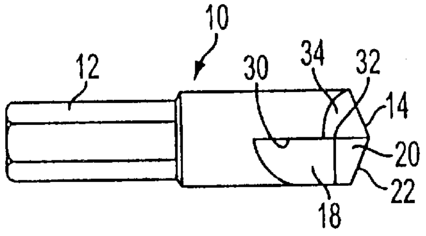
FIGS. 5(*a*) through 5(*d*) are a series of side views taken 90 degrees apart around the periphery of the bit.
Figure 5B:
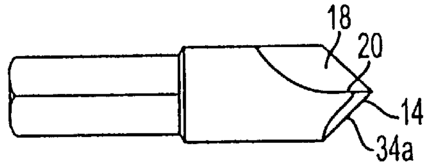
Figure 5C:
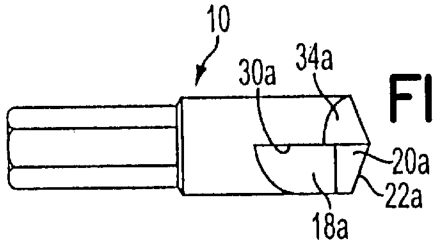
Figure 5D:
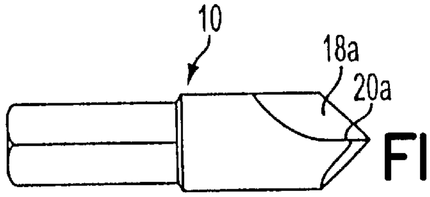

From the scraping surface 20 a transition surface 28 curves and meets the periphery 24 in the FIG. 4 embodiment. Generally perpendicular to the surfaces 20 and 28 is a longitudinal boundary surface 30 which faces clockwise and which has a rearward edge 32 which also is a straight line from periphery 24 to axis 26 of the bit. Next, there is a generally quarter-conical relief surface 34.

The slant of the edge 32 is somewhat greater than the slant of the edge 22. This accentuates the edge 22 and assures that the surface 34 does not merely ride in the metal of the screw, keeping the edge 22 from performing its digging function. As an example, the edge 32 is made at an angle in a range of about 40 to 50°, preferably 45°, to the axis, while the edge 22 is about 70° to the axis. The surface 34 gradually curves from edge 32 up to 22. The metal defined by surface 34 serves to back up and support the scraping surface 20.

The scraping edge 22*a* of the second sector is in the same plane as the first, and the two scraping edges are in the same plane and intersect at the axis of the bit in a point 36. Parts of the second sector (FIG. 5) are designated by the same reference numeral as the first, with an "a" added.

Figure 2:
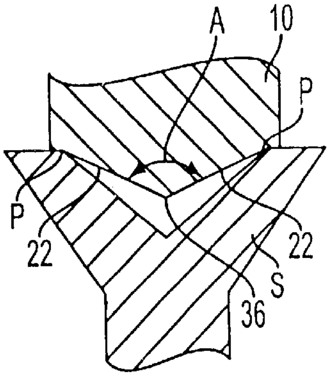
FIG. 2 is an enlarged sectional view through the bit scraping surfaces showing the engagement of the bit with the screw head.

The angle A (FIG. 2) between the edges 22 is obtuse, preferably in the range from 110° to 140°. This angle is less sharp than the angle at the bottom of the cross slot of the Philips recess (FIG. 2). As a result, the edges 22 of the bit engage the portions of the top of the screw at points P well out from the axis and have good purchase and leverage on the screw well out from its axis to break it away from its firm engagement with the wood and put it into rotation with the bit and back it out.

Figure 3:
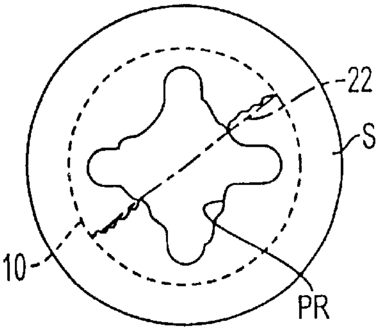
FIG. 3 is a plan view, greatly enlarged, of a damaged screw and showing in broken lines the outline of the bit, and showing in a solid line a projection of the working edge of the bit.

The point 36, having the angle of about 110° to 140° when engaging the vestiges of a standard screw slot serves as a centering means. As in FIGS. 2 and 3, it is the portions of the screw well out from the center which the edges 22 engage and effectively scrape (note the scrapings in FIG. 3 ahead of the edges) and rotate the screw out of its hole.

Second Embodiment

Figure 6:
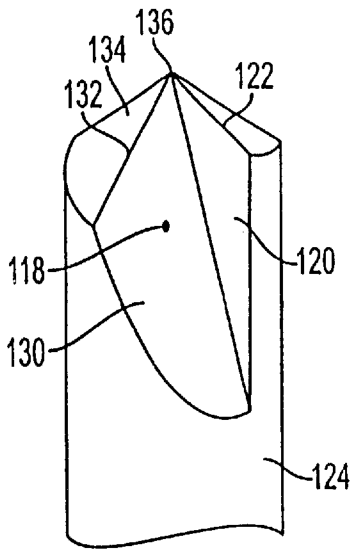
FIG. 6 is a perspective view similar to FIG. 4 of a second embodiment of the invention.
Figure 7A:
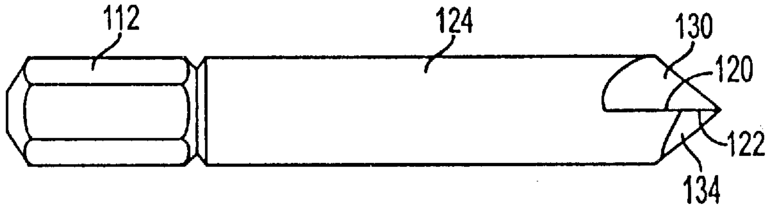
FIGS. 7(*a*) through 7(*d*) are a series of views similar to FIG. 5(*a*) through 5(*d*), but of the FIG. 6 embodiment.
Figure 7B:
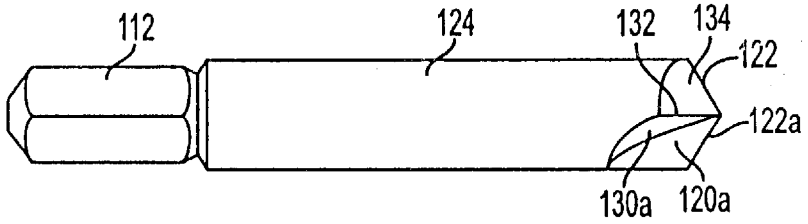
Figure 7C:
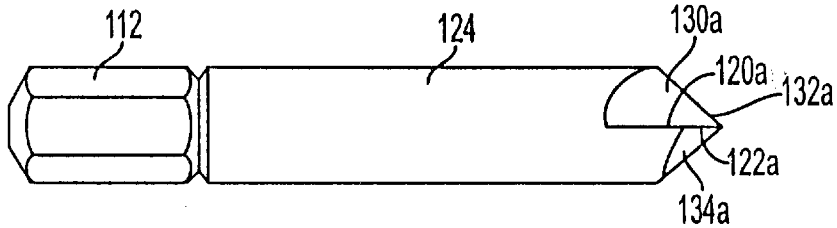
Figure 7D:
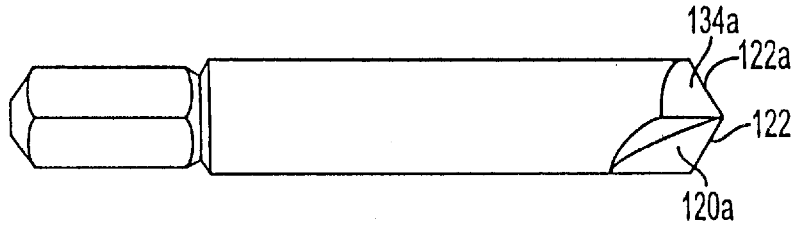

A second embodiment of the invention is shown in FIGS. 6 and 7. Because it represents the simplest way to manufacture the product, it is the preferred or "best mode" form of the invention.

To each element of the FIGS. 6, 7 embodiment the same reference number has been applied as the like element in the previous embodiment, augmented by 100.

The FIGS. 6 and 7 embodiment comprise the bit 124 having an axis and a tip end which comes to a point 136. At diametrically opposite positions the tip end is formed with recesses 118. The recesses each are defined by a planar counter-clockwise-facing scraping surface 120, 120*a* having a scraping edge 122, 122*a*.

As shown in the views comprising FIG. 7, the surface 120, 120*a* is backed by a support portion defined by an upward rounded surface 134, 134*a* which drops down to a rearward edge 132, 132*a* at a sharper incline than the scraping edge 122, 122*a*. The recesses 118, 118*a* are also defined by a downwardly curved surface 130, 130*a* extending down from the rearward edges 132, 132*a*. The surfaces 120 and 120*a* are in the same plane which includes the axis of the bit and are at angles in a range of about 55° to 70°. More preferably the angles are about 55°. The rearward edges 132, 132*a* are also in the same plane as the axis.

Figure 8:
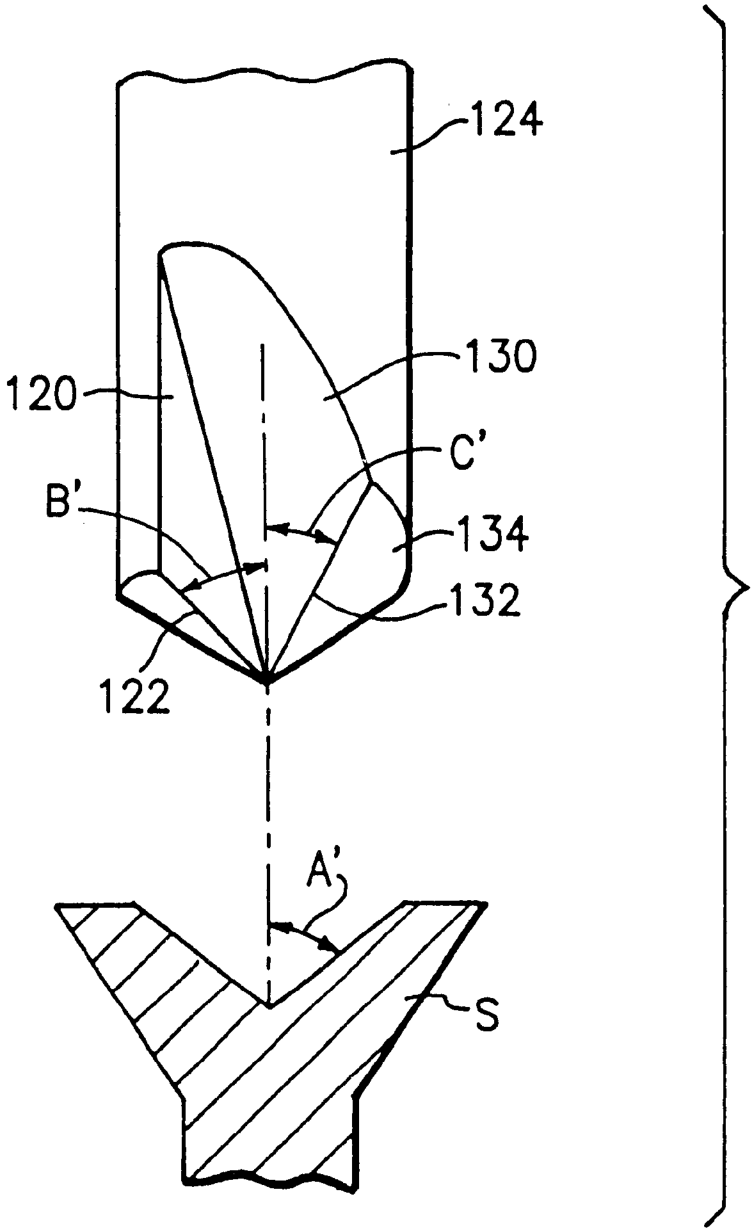
FIG. 8 is a greatly enlarged perspective view of the bit of FIG. 6, inverted, and on axis with the damaged screw in section as shown in FIG. 2.

FIG. 8 demonstrates the first angle A' of the slope of the damaged screw recess to the axis of the bit 124 and screw and the second angle B' of the scraping edge 122 to the same axis. Angle B' is less sharp than angle A'. The third angle C' is sharper than the second angle B'.

The use of the second embodiment of the invention is the same as the use of the first embodiment. The scraping surfaces 122 and 122*a* engage the deformed fastener head as shown in FIG. 2 in positions well outward from the axis of the fastener. This assures a firm purchase of the fastener by the scraping surfaces and results in a "digging" into the top face of the fastener, developing a line of upwardly plowed metal as roughly indicated in FIG. 3.

The bit of the invention may be used to remove screws from wood or metal, or to remove bolts with damaged heads from the threaded element in which they are installed. The invention works well with any kind of end recess: slot, Phillips, hexagonal, etc. In short, it can be used to remove any threaded fastener having a deformed head from the object into which it is threaded. It may be in the form of a hand-driven tool, fitting into the chuck of a handle, or as a one-piece tool with a handle.

Further variations in the invention are possible. For instance, the bit may be formed with three recesses and three scraping surfaces instead of the two diametrically opposed recesses and two scraping surfaces as described. The sides of the bit may be smooth cylindrical as shown in the embodiments or hexagonal. Thus, while the invention has been shown in limited embodiments, it is not so limited but is of a scope defined by the following claim language which may be broadened by an extension of the right to exclude others from making, using or selling the invention as is appropriate under the doctrine of equivalents.

What is claimed is:

1. For removing damaged screws, a bit having an axis and a tip end formed with a point and a rear end formed in hexagonal cross-section adapted for installation in a chuck of a variable speed reversible drill, the tip end having a plurality of longitudinal recesses uniformly disposed about the tip end, each bordered by a longitudinal surface facing in a counter-clockwise direction, the surface formed with a distal straight scraping edge, the scraping edges of the recesses each being in a plane including the axis and being at an angle in the range of 55° to 70° to the axis, and a support portion behind each scraping edge, the support portions each defined by a relief surface curving away from the scraping edge down to a rearward edge bordering one of the longitudinal recesses, each rearward edge also lying in a plane including the axis and being disposed at a more acute angle to the axis than the scraping edge angle.

2. A bit as claimed in claim 1 wherein the angle of the scraping edges to the axis is about 55°.

3. In combination, the bit as claimed in claim 1 and a threaded fastener having an axis, a threaded section and a head section, the head section being formed with a generally radial end surface, a damaged slot in the radial end face, the scraping edges of the bit engaging the radial end face of the fastener with the point generally disposed on the axis of the threaded fastener.

4. A bit as claimed in claim 1 wherein there are two diametrically opposite longitudinal recesses and the scraping edges of the two recesses lie in the same longitudinal plane, which plane includes the axis.

5. A method for unscrewing threaded fasteners installed in an object and having a head with a deformed end surface, the method comprising the steps of:

a. providing a bit having an axis and a tip end formed with a point, the tip end having a plurality of longitudinal recesses uniformly disposed about the tip end, each bordered by a longitudinal surface facing in a counter-clockwise direction and being in a plane including the axis, and formed with a straight scraping edge, the scraping edges of the recesses each being at angles of 55° to 70° to the axis and a support portion behind each scraping edge, the support portions each defined by at the tip end a relief surface curving away from the scraping edge down to a rearward edge bordering one of the longitudinal recesses, each rearward edge also lying in a plane including the axis and being disposed at more acute angle to the axis than the scraping edge, b. engaging the head with the tip end with the scraping edges engaging the end surface of the fastener, c. rotating the bit in a counter-clockwise direction.

6. In combination:

a. a threaded fastener having an axis, a threaded section and a head section, the head section being formed with a generally radial end surface having a damaged cross slot having sloping sidewall portions defining a first angle to the axis, and b. a cylindrical extraction bit having an axis aligned with the axis of the fastener and a tip end formed with a point, the tip end having a pair of longitudinal recesses opposite each other about the tip end, each bordered by a longitudinal scraping surface facing in a counter-clockwise direction and having a scraping edge, the scraping edges lying in a first plane including the axis of the bit and disposed at a second angle to the axis, the second angle being less sharp than the first angle, the scraping edges engaging the end surface of the fastener at the margin of the cross slot.

7. The combination as claimed in claim 6 including a support portion behind each scraping edge, the support portions each defined by a relief surface curving away from the scraping edge down to a rearward edge bordering one of the longitudinal recesses, the rearward edges both lying in a second plane including the axis and being disposed at a third angle to the axis, the third angle being sharper than the second angle.

* * * * *